(12) United States Patent
Dasch et al.

(10) Patent No.: US 12,735,097 B2
(45) Date of Patent: Sep. 15, 2026

(54) METHOD AND CONTROL UNIT FOR OPERATING AN ACTUATOR OF A STEER-BY-WIRE STEERING SYSTEM

(71) Applicant: ZF Friedrichshafen AG, Friedrichshafen (DE)

(72) Inventors: Ingo Dasch, Gräfelfing (DE); Dominik Vogt, Meckenbeuren (DE); Luc Diebold, Magstadt (DE); Magnus Rau, Kirchheim unter Teck (DE); Björn Spangemacher, Aidlingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 389 days.

(21) Appl. No.: 18/261,372

(22) PCT Filed: Oct. 26, 2021

(86) PCT No.: PCT/EP2021/079591
§ 371 (c)(1),
(2) Date: Jul. 13, 2023

(87) PCT Pub. No.: WO2022/152416
PCT Pub. Date: Jul. 21, 2022

(65) Prior Publication Data

US 2024/0067265 A1 Feb. 29, 2024

(30) Foreign Application Priority Data

Jan. 15, 2021 (DE) ..................... 10 2021 200 369.9

(51) Int. Cl.
*B62D 6/02* (2006.01)
*B62D 5/00* (2006.01)
(Continued)

(52) U.S. Cl.
CPC ............... *B62D 6/02* (2013.01); *B62D 6/002* (2013.01); *B62D 5/001* (2013.01); *B62D 7/159* (2013.01)

(58) Field of Classification Search
CPC .......... B62D 6/002; B62D 6/02; B62D 5/001; B62D 5/0457; B62D 7/159; B62D 15/027;
(Continued)

(56) References Cited

U.S. PATENT DOCUMENTS 5,003,480 A * 3/1991 Mori ...................... B62D 7/159 701/42
8,095,273 B2 * 1/2012 Moshchuk ............. B62D 7/159 180/413
(Continued)

FOREIGN PATENT DOCUMENTS

DE 199 40 007 A1 8/2001
DE 102 21 721 A1 11/2003
(Continued)

OTHER PUBLICATIONS

European Patent Office, International Search Report issued in International patent application No. PCT/EP2021/079591 (Jan. 28, 2022).
(Continued)

*Primary Examiner* — Logan M Kraft
*Assistant Examiner* — Johnny H Hoang
(74) *Attorney, Agent, or Firm* — Secant IP, PLLC

(57) ABSTRACT

A method is provided for operating an actuator of a steer-by-wire steering system of a motor vehicle at speeds from a standstill up to parking and/or maneuvering speeds. The method includes detecting an instantaneous steering angle of at least one wheel on an axle of the motor vehicle, detecting a steering angle demand, determining a limit value of an
(Continued)

acceleration of a drive mechanism of the actuator at least as a function of the instantaneous steering angle, and activating the actuator for setting a steering angle of at least one wheel as a function of the steering angle demand and using the limit value of the acceleration.

14 Claims, 3 Drawing Sheets

(51) Int. Cl.
*B62D 6/00* (2006.01)
*B62D 7/15* (2006.01)

(58) Field of Classification Search
CPC .............. B62D 15/0285; B60W 30/06; B60W 2540/18; B60W 2710/205
USPC ...................................................... 701/41–47
See application file for complete search history.

(56) References Cited

U.S. PATENT DOCUMENTS

| | | | | |
|---|---|---|---|---|
| 8,417,420 | B2 | 4/2013 | Kim | |
| 8,983,728 | B2 | 3/2015 | Kossira et al. | |
| 10,144,448 | B2 * | 12/2018 | Minaki | B62D 1/286 |
| 12,097,916 | B2 * | 9/2024 | Akatsuka | B62D 15/025 |
| 2012/0265404 | A1 * | 10/2012 | Kim | B62D 6/002 701/43 |
| 2018/0118263 | A1 * | 5/2018 | Schiebahn | B60W 30/10 |

FOREIGN PATENT DOCUMENTS

| | | | |
|---|---|---|---|
| DE | 10 2006 018 261 | A1 | 10/2007 |
| DE | 10 2012 022 900 | A1 | 5/2014 |
| DE | 10 2013 016 422 | A1 | 4/2015 |
| DE | 10 2014 206 934 | A1 | 10/2015 |
| DE | 10 2014 017 127 | A1 | 5/2016 |
| DE | 10 2016 221 563 | A1 | 5/2018 |
| DE | 10 2012 206 025 | | 10/2018 |
| DE | 10 2017 206 701 | A1 | 10/2018 |
| DE | 10 2018 208 934 | A1 | 6/2019 |
| DE | 10 2018 124 244.1 | A1 | 4/2020 |
| EP | 2562064 | A2 | 2/2013 |

OTHER PUBLICATIONS

European Patent Office, Written Opinion issued in International patent application No. PCT/EP2021/079591 (Jan. 28, 2022).
German Patent Office, Search Report issued in German patent application No. 10 2021 200 369.9 (Jul. 15, 2021).
European Patent Office, International Search Report issued in International patent application No. PCT/EP2021/079592 (Jan. 28, 2022).
European Patent Office, Written Opinion issued in International patent application No. PCT/EP2021/079592 (Jan. 28, 2022).
German Patent Office, Search Report issued in German patent application No. 10 2021 200 370.2 (Jul. 15, 2021).
German Patent Office, Office Action issued in German patent application No. 10 2021 200 370.2 (Sep. 8, 2023).
United States Patent Office, Non-Final Office Action issued in U.S. Appl. No. 18/261,375 (mailed Feb. 10, 2025).

* cited by examiner

METHOD AND CONTROL UNIT FOR OPERATING AN ACTUATOR OF A STEER-BY-WIRE STEERING SYSTEM

RELATED APPLICATIONS

This application claims the benefit under 35 U.S.C. § 371 as a U.S. National Phase Application of application no. PCT/EP2021/079591, filed on 26 Oct. 2021, which claims benefit of German Patent Application no. 10 2021 200 369.9 filed 15 Jan. 2021, the contents of which are hereby incorporated herein by reference in their entireties.

FIELD OF THE DISCLOSURE

The invention relates to a method and a control unit for operating an actuator of a steer-by-wire steering system of a motor vehicle, according to the preamble of the independent claims.

BACKGROUND

From DE 10 2014 208 934 A1 an actuator with a positionally fixed spindle nut and a spindle which can be displaced relative thereto is known. At least one end of such an actuator, which is used in a steer-by-wire steering system, is connected to a wheel carrier by means of a steering link. By virtue of the linear displacement of the spindle the wheel steering angle of a wheel mounted to rotate on the wheel carrier can be changed. The steer-by-wire steering system, which can be actuated at least indirectly by way of a steering handling device such as a steering-wheel or which works independently of any such, is controlled along the signal path, i.e., without any mechanical coupling. During a steering process such a steering system has to overcome a frictional resistance of the wheels relative to the road. Particularly at very low speeds, such as when maneuvering or parking until the vehicle is at a standstill, comparatively large steering forces are needed, and these forces severely stress the actuator. A spindle drive of the actuator can be excited into resonance vibrations by alternating static friction and sliding friction, and the spindle drive can reach high temperatures, which can result in damage to the actuator and hence to the steer-by-wire steering system.

SUMMARY

Against that background a purpose of the present invention is to indicate an improved method and an improved control unit for controlling an actuator of a steer-by-wire steering system of a motor vehicle, when the vehicle is steered while at rest or is moving at a very low speed while parking or maneuvering.

According to a first aspect of the invention, a method is indicated for operating an actuator of a steer-by-wire steering system of a motor vehicle which is steered while at rest or moving at a very low speed compared with normal driving, the said method having the following steps:

- Detection of an instantaneous steering angle of at least one wheel on an axle of the motor vehicle,
- Determination of a steering angle requirement,
- Determination of a limit value of an acceleration of a drive mechanism of the actuator, at least as a function of the instantaneous steering angle,
- Activation of the actuator to set a steering angle of at least one wheel as a function of the steering angle requirement, with at least temporary application of the limit value of the acceleration.

An actuator of a steer-by-wire steering system of a motor vehicle preferably comprises a housing, in which a spindle and a rotatable but positionally fixed spindle nut are accommodated. The spindle and the spindle nut form a movement thread and within the housing constitute part of a spindle drive mechanism for the axial displacement of the spindle relative to the spindle nut, and thus also relative to the housing. For that purpose, the spindle has an outer thread which engages with the inner thread of the spindle nut. When the spindle nut is driven in rotation, for example by an electric motor and preferably indirectly by a transmission system, preferably a belt transmission, then the effect of the movement thread is that the spindle is displaced axially along its longitudinal axis relative to the spindle nut and the housing. By virtue of the said axial movement along its longitudinal axis the wheel steering angle of a wheel arranged to rotate on a wheel carrier can be changed, the said wheel carrier being connected at least indirectly to an end of the spindle.

The high adjustment forces required during steering result in severe friction in the transmission system of the actuator, particularly in the movement thread of a spindle drive of the actuator. Even when optimized lubricants are used, severe friction occurs between the flanks of the thread inside the movement thread, i.e., between the spindle and the spindle nut. Owing to the static and sliding friction between the thread partners that takes place on the contact surfaces of the thread flanks in contact with one another, a so-termed stick-slip effect can occur. This is the alternating sticking and sliding of the thread flanks, which can result in fluctuating torques between the spindle nut and the spindle itself. Thereby, the spindle can be, for example, excited into vibrations, in particular rotary vibrations. A continuous or temporary excitation lasting for a minimum time can result in generating a resonance frequency of the spindle or other components in the actuator. Furthermore, the vibrations result in thermal loading, which can affect the lubricating properties of the lubricant adversely. This can have a negative effect on the life of the actuator.

The aforesaid rotary vibration is also known as torsional vibration. In contrast to translational vibrations, rotary vibrations oscillations take place about the rotational degree of freedom of a system, in this case about the longitudinal axis of the spindle. In both cases these are mechanical oscillations.

The term 'stick-slip effect' derives from the two English words "stick" (adhere) and "slip" (slide). In physical and technological contexts, the stick-slip effect describes a generally undesired jerky sliding movement (standstill-slide-standstill-slide . . . ) of solid bodies moving relative to one another.

A steer-by-wire steering system is a steering device decoupled from the mechanical connection to a steering handling device such as a steering-wheel. The steering movement by the driver by means of a steering handling device is not transmitted to the wheel carriers or wheels along any mechanical path such as a linkage. Rather, a steering angle for the respective wheels of an axle are calculated for example in a control unit which sends positioning signals to the actuator or actuators of the steer-by-wire steering device and ultimately produces the wheel steering angle change or adjustment of the steering angle. During this the steering angle demand by the driver or a calculated steering angle change may be different from the maximum steering angle that can be set at the axle concerned, for example it may be larger. In such a case, at most the maximum steering angle can be set. The steering angle demand consists of the change of the steering angle from the existing steering angle to an intended steering angle, and the steering angle demand is also a function of time. As an example, let it be said here that a driver can turn the steering-wheel slowly, for example at 2°/s, but also very quickly, for example at 20°/s, in order to change the steering angle for example by 5°. In other words, on the one hand the change of angle, but also the rate of the angle change is detected.

During the normal operation of a steering device, for the most part small wheel steering angle changes are carried out when the vehicle is moving at a speed substantially higher than the range mentioned earlier, for example when driving in a closed township at speeds from 30 to 50 km/h, or on a main road or a motorway at even higher speeds. Then, as a rule steering angle changes of less that 1° are expected. Thus, for such small changes comparatively small adjustment forces are needed, so rotational vibrations do not take place.

The approach presented here is based on the knowledge that in some situations a higher torque or a larger force is needed for steering a respective wheel, or in other words forcing it into a desired steering angle or wheel steering angle. The situation considered here starts from when the vehicle is at rest to when it is moving at a very low speed, as when parking and/or maneuvering. When fully at rest the speed is equal to 0 km/h. During parking and/or maneuvering a speed equal to or lower than 1 km/h can be assumed. In a speed range from 0 to about 1 km/h the forces required for producing the desired steering angle are particularly large. The lower the speed, the larger are the steering forces for this that have to be exerted by the actuator of the steer-by-wire steering system. This is because the total gravitational force of the vehicle is supported by the tires fitted on its wheels. The contact between the tires and the road is determined by the tire contact area. The size of the contact area of a tire depends mainly on the wheel loading and the tire pressure, because the internal pressure of the tire bears most of the wheel load. However, tire width, tire diameter and the rigidity of the sidewalls also play a part. When a wheel is at rest the force required for steering it, i.e., rotating it about its vertical axis, is larger than when it is rolling, because the vehicle is moving. As the rolling movement increases, i.e., as the travel speed increases, less and less force is needed for steering. It can be understood that aside the mass of the vehicle, the temperature of the environment and the tire temperature also have an influence since they directly affect the friction between the tires and the road surface. Not exclusively, the following additional parameters may also be mentioned: tire composition, type of tire, friction coefficient of the tire, road surface covering and condition of the road (dry, wet, smooth, etc.).

The tire of a wheel is, as a rule, made of rubber—an elastic material. If now a force for steering the wheel, applied by the actuator of a steer-by-wire steering system, acts upon the wheel, then a prestress is produced due to the static friction or sliding friction between the tire and the road surface. The tire is as it were raised relative to the road and thus prestressed. Further prestress is produced between the actuator and the wheel carrier by bearings between them and sometimes also links, such as a steering linkage, depending on the design of the chassis.

If now, in the aforesaid low-speed range, the wheel is steered back starting from a large, preferably maximum possible steering angle to a smaller steering angle, then the prestresses are first reduced for a short time and new prestresses are produced. This prestress increases the lower is the speed of the vehicle or when it changes from rolling to a standstill. During parking and/or maneuvering this is the case, almost in constant alternation. When steering back from the previously set large steering angle a force direction change takes place in the actuator of the steer-by-wire steering system. This results in a load change within a transmission or spindle drive of the actuator, so that in turn it adopts a different stick-slip behavior. This can result in vibrations and high thermal loads in the actuator and its movement thread. That behavior must be reduced or minimized.

According to the invention, in the aforesaid method, as a function of the instantaneous steering angle of at least one wheel on the axle of the motor vehicle concerned the maximum possible acceleration of the drive of the actuator of a steer-by-wire steering system is limited. Due to this limiting of the acceleration, the starting up, for example, of an electric motor as the drive mechanism of the actuator is made slower. In the transmission or spindle drive of the actuator, limiting the acceleration can result in better behavior of the friction partners in the actuator, for example the thread flanks of the movement thread in contact with one another. In that way the above-mentioned rotary vibrations and the thermal loading are minimized or even do not occur at all.

Limiting the acceleration is achieved by the step for determining a limit value of an acceleration of the actuator drive mechanism. The limit value is determined at least as a function of the instantaneous steering angle. The instantaneous steering angle is detected continuously, preferably at intervals, preferably intervals of 10 ms. For this, preferably at intervals and preferably at intervals of 10 ms, an instantaneous steering angle demand is determined, this for example being set in accordance with the wish of the driver as indicated by turning the steering-wheel. In this case, for one thing the changed steering angle and also the rate of the change are determined.

For example, during parking a steering angle as large as possible is set at the front axle, so that the wheels are turned as far as possible in one direction, such as to the left. Owing to this steering angle demand, a maximum steering angle of the steer-by-wire steering system will have been set by a control unit at the rear axle in the opposite direction, i.e., in this case to the right. Typically, after such a steering maneuver during parking the vehicle comes to rest. The actuator of the steer-by-wire steering system also comes to rest and for a moment no steering angle adjustment is carried out. Now, the driver again steers back at the steering-wheel in the opposite direction. Alternatively, a steering assistance system can also have actuated the steering system. At the steering-wheel a new steering angle is now requested or the previous steering angle is to be reduced. This steering movement is performed by the driver at the steering-wheel at a certain speed. The said parameters are detected by the control unit and in the step of determining the limit value, the acceleration of the actuator drive mechanism is limited as a function of the instantaneous steering angle and the instantaneous steering angle demand. Finally, having regard at least to the aforesaid parameters and using the limit value of the acceleration, the actuator of the steer-by-wire steering system is controlled so as to set the calculated steering angle. The actuator is preferably controlled by a control unit such as a controller or a control system. The controller or control system is preferably part of the steer-by-wire steering system. However, the actuator can also be controlled by means of a further controller built into the vehicle.

Without such limiting by determining a limit value the drive mechanism, for example an electric motor, would be brought by virtue of a predefined acceleration to a nominal rotation speed which has been established for the adjustment of a steering angle for the design of the steer-by-wire steering system, in order to carry out a steering angle change within a predefined time. In combination with the transmission or the spindle drive of the actuator the said nominal rotation speed brings about a predefined adjustment speed which ultimately produces a steering speed and is also known as a steering gradient. The steering gradient indicates by which angle per unit of time, i.e., for example by how many degrees per second the particular steered wheel can be moved about its vertical axis. For different driving situations and boundary conditions, such as vehicle loading, such as the type of tire used or the road condition etc., different steering gradients can be determined. At the above-mentioned nominal rotation speed the actuator can for example act at an adjustment speed such that in the case of a vehicle which is stationary, ready to drive and unloaded, with its wheels on a dry road, the wheels can be adjusted by the steer-by-wire steering system with a steering gradient for example of up to 18°/s. In such a case, owing to the friction between the tires and the road at low speed, such as when parking and/or maneuvering, the steering speed can be lower, for example from 2 to 8°/s. In contrast, at very high speeds such as 250 km/h, the steering gradient is reduced or limited for example to 0.25°/s in order to avoid sudden steering movements that could result in dangerous driving situations.

In this context large steering angles are understood to mean steering angles which reach the range of the designed possible maximum steering angle for the axle concerned. Furthermore, during maneuvering or parking the speed of the vehicle and the wheel steering angle often change. By using a larger, preferably the largest possible steering angle, it is simpler to drive for example into a parking space or to maneuver with a trailer. Thus, it is particularly advantageous if, in addition to the front axle, the rear axle of the motor vehicle can also be steered.

A steering angle of 0° is also called the middle position or the neutral steering angle and corresponds to driving a vehicle straight ahead when a steering angle of 0° is set at each steerable axle. The wheels are then parallel to the longitudinal direction of the vehicle.

In a preferred embodiment the limit value is used at least temporarily. The limit value is cancelled when a steering angle is set at which, for example, no further limiting of the acceleration is needed. It is also possible for the limit value to be used for a predefined time, so that when that time has lapsed it is set back to a nominal or maximum value or cancelled. As a function of a changed steering angle demand, a previously determined limit value can also be changed, particularly reduced starting from the previously set value, in order to take into account an emerging changed driving situation.

Also preferred is an embodiment in which, in the step of determining, the limit value is set to a predefined minimum value. For example, such a predefined minimum value can correspond to half or three-quarters of the maximum acceleration of the drive mechanism. In that way it is advantageously ensured that the acceleration of the actuator drive mechanism is always sufficient for the drive to start up so that a steering angle can always be adapted under any conceivable conditions or driving situation. In other words, a start-up torque is ensured so as to make sure that the drive mechanism will start up in accordance with any driving situation of the motor vehicle.

In the step of determining a limit value, the acceleration is limited at least as a function of the instantaneous steering angle. In an advantageous embodiment, steering angle ranges can be established in such manner that a particular limit value can be assigned to each range. With an instantaneous steering angle of less than 50 to 80% of a maximum possible steering angle, in the determination step a limit value can be determined other than outside that range. Preferably the range can be restricted to a steering angle less than 65 to 70% of a maximum possible steering angle. For example, there is a first range with a steering angle of 0 to 70% of a maximum possible steering angle, and a second range with a steering angle larger than 70% up to the maximum possible steering angle. For example, a rear axle can be designed such that a maximum steering angle of 10° is possible. If this maximum steering angle is set and back-steering is carried out for example to 8°, then in the second range the acceleration of the drive actuator is limited. In the first range of 0 to 70% or in the present example 0 to 7°, for example no limitation of the acceleration is carried out because at steering angles of that order of magnitude the prestress is so small that rotary vibrations in the actuator are negligible or do not occur at all. In other words, a limit value preferably above 70% up to 100% of the maximum steering angle is determined. Preferably, the limit value is cancelled when the steering angle is changed to within the range 0 to 70% or reaches that range.

Preferably, four support points can be provided. In that case a first range from 0 to 60%, a second range higher than 60% up to 80% and a third range higher than 80% up to 100% of the designed maximum steering angle are established. The said support points are than 0, 60%, 80% and 100%. In the case of a maximum steering angle of 10°, the support points are 0°, 6°, 8°, and 10°. Different limit values for the acceleration can be assigned to these steering angles or the ranges between them. The corresponding assignments can advantageously be stored as characteristics in a control system, so that in the determination step an appropriate limit value can be called up with reference to the said characteristics.

For different driving situations, different characteristics can be stored in a control system. This consideration takes into account that a predefined maximum steering angle, which is possible by virtue of design with the steer-by-wire steering system in the vehicle concerned, can change. Such a driving situation can arise for example due to the loading of the vehicle. For example, due to the load the wheels are covered more deeply by the wheel arches and the steering angle has to be limited, for otherwise the wheels or tires would collide with the chassis or vehicle body if the maximum possible designed steering angle were to be set. The loading also produces a higher wheel load, which necessitates a larger force for steering. In a known way the load of the vehicle can be detected by means of suitable sensors such as height level recognition sensors. On the basis of the height level recognition, for example, a characteristic can be chosen which can have a smaller maximum steering angle. A limited maximum steering angle can for example also be determined due to the use of wider tires or the use of snow chains, etc. Having regard to the structural space available in the area of the wheel arches, it may also even be necessary for the maximum available steering angle to be restricted because there is not enough space available for steering movements. For this, the tires or wheels can for example be equipped with RFID sensors which indicate the condition of the tires to a control unit. In that way, by virtue of these possibilities support points for limit values for the acceleration, that differ from the normal condition of the vehicle but suffice for the driving situation at the time, can be specified.

Preferably the loading and the consequent higher wheel loads are taken into account in at least one characteristic. Thus, the support points mentioned earlier can vary. In particular the values of the support points are reduced as a function of the loading. In relation to the four aforementioned support points and the associated steering angle ranges, as a function of the loading the first range, for example, can be reduced to 0 to 45%. The second range can then extend from above 45 up to 60% and the third range from above 60 up to 70% of the designed maximum steering angle. In the case of a maximum steering angle of 10°, the support points will then be at 0°, 4.5°, 6° and 7°. The dependence on the loading can also be represented as a function. When the load is increased, in an advantageous manner the acceleration of the drive mechanism and/or the steering gradient and/or the steering angle are limited.

If the vehicle is moving at the above-mentioned low speed, the limit value, i.e., the limited acceleration, brings about a slower start of the drive mechanism. To reach an intended steering angle called for by a steering angle demand, the actuator is basically operated at a predefined adjustment speed in order to be able to set a steering angle at the wheels of an axle in accordance with the steering angle demand within a certain time. Due to the limited acceleration in combination with the predefined steering speed an offset is produced, so that the required steering angle is not reached until later than it would have been without a limited acceleration. To compensate for this offset, the steering speed or steering gradient is changed, preferably increased, at least temporarily. For this, having regard to the steering angle called for and/or an instantaneously set steering angle the predefined adjustment is increased. In other words, after the slower start of the actuator the acceleration takes place temporarily at a higher steering gradient. Advantageously, in that way and despite the limited acceleration of the drive mechanism, the change of steering angle by the steer-by-wire steering system takes place reaching the desired steering angle in accordance with the steering angle demand at the same time as it would have with the predefined acceleration of the actuator drive mechanism. In a vehicle speed range from rest up to a maximum of 1 km/h, preferably up to 0.7 km/h, the steering gradient can be in a range from 0 to 12°/s. Depending on the steering angle demand the steer-by-wire steering system is operated with an adapted steering gradient. For a temporary increase of the steering gradient this can be increased by 20 to 70%, preferably 30 to 50%. Preferably, the maximum steering gradient can be increased for a short time from 12°/s, by 4 to 6°/s up to 18°/s, so that the intended steering angle change can be carried out in the envisaged time, i.e., as far as possible in accordance with the steering angle demand.

So that no abrupt steering movement takes place when the low speed range is left and the speed in increasing, preferably with a rapid increase of the vehicle's speed for example owing to a sudden rapid acceleration of the vehicle, it can be provided that with increasing speed there is no 'hard' switching of the steering gradient. Moreover, the limit value for limiting the acceleration of the drive mechanism is preferably not changed abruptly. Instead, preferably a gradual adaptation in the sense of a smooth transition of the previously cancelled steering gradient and also of the limit value to a target value or to the nominal acceleration is carried out. That is advantageous with a view to driving safety and control of the vehicle and driving comfort.

In a further preferred embodiment, in a further step an instantaneous speed of the motor vehicle is detected, particularly at intervals, preferably at intervals of 10 ms. In that case, in the step of determining the limit value of the limited drive mechanism acceleration the instantaneous speed can be taken into account, in such manner that above a certain speed limit the limit value is cancelled. The speed limit characterizes the departure from the aforesaid low speed range and is therefore above 1 km/h, preferably 1.1 km/h, preferably above 0.7 km/h and preferably at most 0.71 km/h. Basically, in the method according to the invention the limit value for the limited acceleration is determined as a function of the instantaneous steering angle at the motor vehicle axle concerned. If the steering angle is within the aforesaid first range of 0 to 70% of a maximum possible steering angle at the axle concerned, then in this embodiment, in the step of determining the limit value of the acceleration the latter is preferably not limited. To add additional redundancy with a view to safety and to be able to carry out the method with greater precision in relation to the determination of the limit value, in an advantageous manner the operation of an actuator of a steer-by-wire steering system can be improved further.

Particularly advantageous is an embodiment in which, in the step of controlling the actuator, a steering system associated with a steerable rear axle of the motor vehicle is actuated. If a steering angle can be set at the rear axle which is opposite to the steering angle at the front axle, then at low speeds this provides a smaller turning circle than in a vehicle with a rear axle that cannot be steered. Thanks to the steering of the rear wheels the vehicle can be maneuvered or parked more easily. The steering of the rear axle is preferably carried out by a steer-by-wire steering system.

Advantageously, by virtue of the invention the vibration behavior of the actuator or the components in it can be minimized without modifying an existing actuator of a steer-by-wire steering system by controlling it in accordance with the method. In combination with the improvement of the lubricant supply, in that way the overall useful life of the steer-by-wire steering system can be extended inexpensively.

According to a further aspect, the invention also relates to a control unit for controlling an actuator of a steer-by-wire steering system of a motor vehicle, wherein the control unit has at least the following features:

- an interface for detecting a steering angle that represents an instantaneous steering angle of at least one wheel of a motor vehicle,
- a further interface for detecting a steering angle demand that represents an instantaneous steering angle change due to a driver's wish, or determined by the said control unit, or a steering angle change determined by another control unit,
- a unit for determining a limit value of an acceleration of an actuator drive mechanism, which represents a limited acceleration,
- a unit for activating the actuator in order to set a steering angle of at least one wheel, as a function of at least the steering angle demand and using the limit value,
- preferably an interface for detecting a speed, namely the instantaneous speed of the motor vehicle.

The control unit is also capable of ignoring the limited steering angle temporarily, i.e., at times and for a certain time period. Besides an instantaneous steering angle change due to a driver's wish, i.e., when the driver for example makes a steering movement with a steering-wheel, a steering angle can be called for by virtue of a steering function such as an electronic stability program (ESP) etc., that is run in a control unit.

In this case the control unit can be a control device, for example an electric device which processes electric signals, for example sensor signals, and as a function thereof emits control signals. The device can have one or more suitable interfaces, which can be in the form of hardware and/or software means. In the case of a hardware system the interfaces can for example be part of an integrated circuit in which functions of the device are implemented. The interfaces can also be self-sufficient integrated switch circuits or can consist at least partially of discrete structural elements. With a software system the interfaces can be in the form of software modules or part of a computer program implemented for example on a microcontroller in addition to other software modules.

Also advantageous is a computer program product with program codes, which can be stored on a machine-readable data carrier such as a semiconductor memory, a hard disk memory or an optical memory and is used for carrying out the method in accordance with one of the embodiments described earlier when the program is run in a computer or a control unit.

BRIEF DESCRIPTION OF THE DRAWINGS

Below, the invention is described with reference to preferred embodiments and to the drawing, which shows.

DETAILED DESCRIPTION

Figure 1:
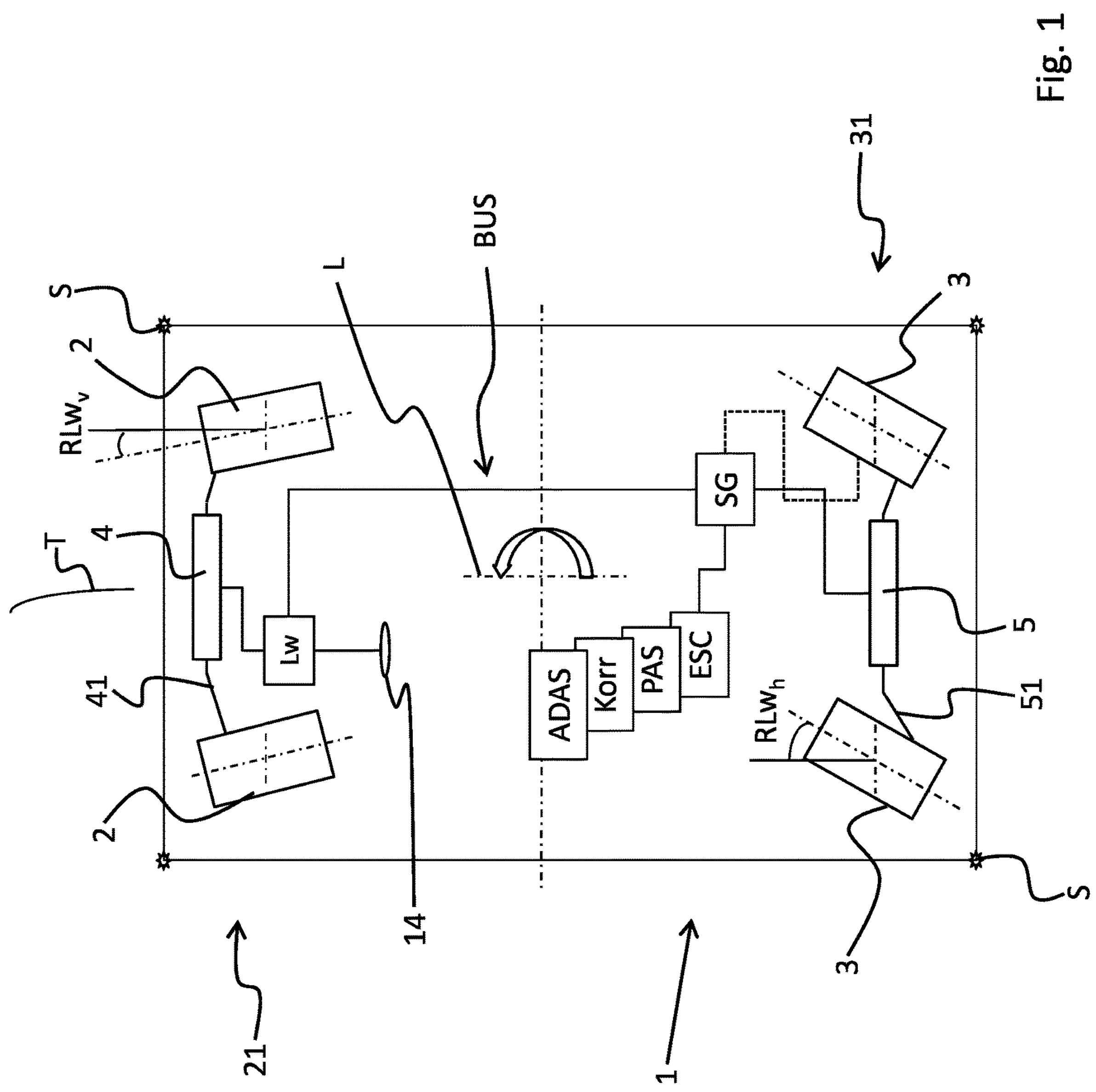
FIG. 1: A vehicle with a steer-by-wire steering system.

FIG. 1 shows schematically a vehicle 1 with a steerable front axle 21 and a steerable rear axle 31. To steer the wheels 2 on the front axle 21 a steer-by-wire steering system 4 is provided, which by way of a steering linkage 41 can set the wheel steering angle $RLw_v$ at the front axle or change that angle. This angle $RLw_v$ is shown as an example at the front, right-hand wheel 2 of FIG. 1. At the rear axle 31, by way of a steering linkage 51 a steer-by-wire steering system 5 sets or changes the wheel steering angle $RLw_h$ of the rear wheels 3, as indicated for the rear wheel 3 on the left. As part of the steer-by-wire steering system in each case an actuator (not shown) is provided, which can apply a force in order move a steering rod or spindle linearly, which rod or spindle collaborates by way of the steering linkages 41, 51 with the wheels 2, 3 to steer them. In the embodiment shown, the wheels on the front axle 21 and the rear axle 31 are steered in opposite directions, so that at a low speed for example of less than 5 km/h the turning circle is advantageously reduced and the maneuvering and parking abilities are improved compared with vehicles that have only one steerable axle. Furthermore, with two steered axles automated journeys can be carried out advantageously since the vehicle can be maneuvered in a smaller space. The steering angle is set at the front axle 21 essentially by means of a steering-wheel 14, whereby the steering angle desired by the driver is detected via a sensor unit Lw by a control unit SG and sent by way of a signal line to the steer-by-wire steering system 4. From the steering angle demand Lw_req indicated by the driver, the control unit calculates the steering angles $RLw_v$, $RLw_h$ for the front and rear axles as a function of the driving situation (loading, vehicle speed, vehicle acceleration, yaw rate $R_G$, etc.) and emits control signals to the steer-by-wire steering systems 4, 5, which then set the corresponding steering angles at the axles 21, 31.

The control unit SG is connected by here schematically depicted signal lines to the steer-by-wire steering systems 4, 5, which set the steering angles $RLw_v$, $RLw_h$. The sensor units (not shown) for determining the respective steering angles $RLw_v$, $RLw_h$ of the wheels 2, 3 are electrically connected by a BUS system to the control unit SG and to the steer-by-wire steering systems 4. 5. The bus system is for example a CAN bus or even a Flexray bus or similar bus system, which is used in vehicles for data and signal transmission. By way of the bus system, steering functions for a driver assistance system such as ADAS autonomous driving, Korr corridor functions for limiting a maximum steering angle as a function of the driving situation, a PAS parking assistance system for assisted or automated parking, or even an ESC electronic stability control system, etc., are transmitted electrically between the control unit SG and the steer-by-wire steering systems 4, 5 of the front axle 21 and the rear axle 31. The control unit SG is represented schematically, and as a central unit emits control signals to the steer-by-wire steering systems 4, 5, which implement the steering angle changes and set the steering angles $RLw_v$, $RLAw_h$.

At the ends of the vehicle 1 sensors S are arranged, which are associated with a sensor system and serve to recognize the environment of the vehicle. These can be temperature sensors or optical sensors, for example including a camera, or even LiDAR or radar sensors, which are suitable for detecting temperature, distances or even for optical observation for example of the road. Thus, environmental conditions can be detected and transmitted to the control unit SG. The vehicle follows a trajectory T, i.e., a driving route, which in FIG. 1 is represented schematically at the front end of the vehicle in its travel direction and in the case shown represents the driver's intention to drive to the left.

In order to turn the wheels 2, 3 of the vehicle 1 by means of the respective steer-by-wire steering systems 4, 5 about their vertical axis for the purpose of setting a steering angle, the friction of the tires of the wheels 2, 3 against the road has to be overcome. The lower the speed of the vehicle, the less do the wheels 2, 3 move or roll on the road in the intended travel direction. In the vehicle 1 shown, its gravitational force loads the four wheels 2, 3 represented or their tires. The contact between tires and road is determined by the tire contact area. By virtue of the tire material, as a rule mostly rubber, and the condition of the road, there is friction between the tires and the road. The lower the speed of the vehicle, the more force is required for steering the wheels 2, 3 since the friction increases as the speed decreases. On this point see also the detailed explanation given earlier.

If now, for example, a wheel 2, 3 on the steerable axles 21, 31 is steered for example away from a position (not shown) parallel to the longitudinal axis L of the vehicle 1 to the right away from 0° to the angle $RLw_h$ as shown at the rear axle 31, and if during this the speed of the vehicle is in a range from standstill to about 1 km/h, then owing to the friction against the road a prestress builds up in the tires. This prestress is greatest when the vehicle is at rest. The tire material is elastic and, as it were, is raised relative to the road. Furthermore, prestresses can be produced due to elasticity in the steering linkages 41, 51 and in the joints (not shown). If now, after the wheels 3 on the rear axle have been deflected, they are back-steered in the opposite direction, then there will be a change of the force direction in the steer-by-wire steering system 5 of the rear axle. During the back-steering the actuator of the steer-by-wire steering system 5 is unloaded at least for a short time and is then severely loaded again owing to the force required or to be produced for the back-steering. The larger the instantaneously set steering angle $RLw_h$ and the lower the speed of the vehicle, the higher is the prestress produced. For example, during back-steering rotary vibrations can occur in the actuator of the steer-by-wire steering system, which can also result in thermal loads for a rotation/translation transmission or a spindle drive and can ultimately be damaging for the actuator. The method described below minimized the loading in the actuator.

Figure 2:
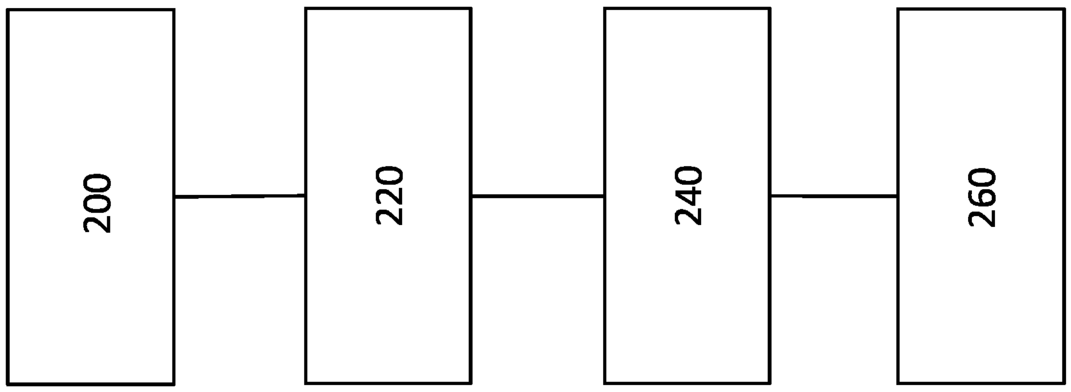
FIG. 2: A flow chart of the method
Figure 3:
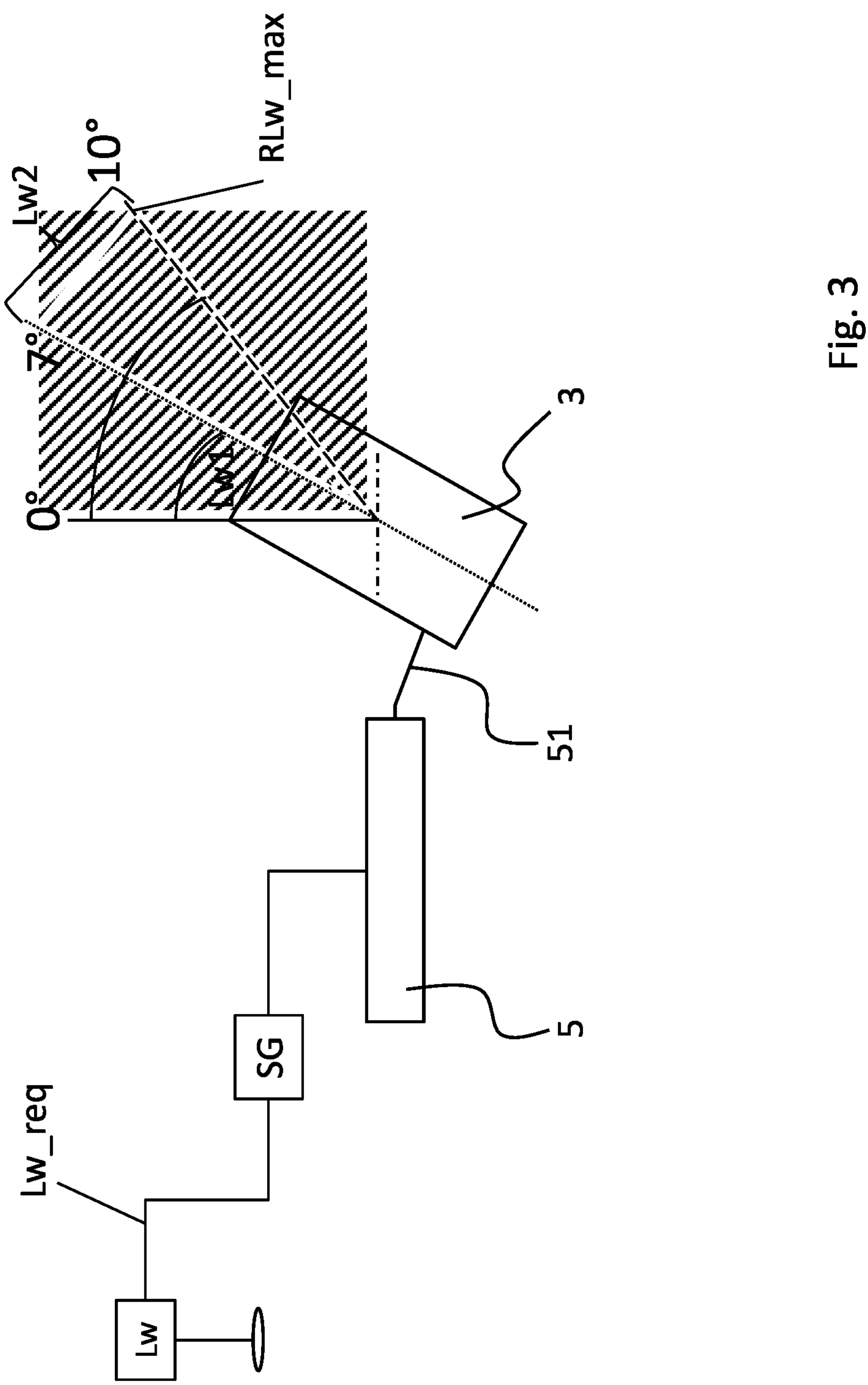
FIG. 3: A diagram illustrating the method

The following information relates equally to FIGS. 2 and 3. FIG. 2 shows a flow chart for implementing the approach of a method for operating an actuator of a steer-by-wire steering system of a motor vehicle at speed from standstill to parking and/or maneuvering. FIG. 3 shows a diagram to explain the method.

In a first step 200 the instantaneous steering angle $RLw_v$_mom, $RLw_h$_mom set at the axle 21, 31 concerned by a control unit SG in which a computer program is running, is detected by means of a suitable sensor system (not shown). The sensor system can be a wheel steering-angle sensor. The control unit SG recognizes whether the instantaneous steering angle $RLw_v$_mom, $RLw_h$_mom corresponds to a first steering angle range Lw1 or to a second steering angle range Lw2 indicated by shading. In this embodiment the first steering angle range corresponds to a steering angle from 0° up to a steering angle smaller than or equal to 7°. The second steering angle range Lw2 corresponds to a steering angle larger than 7° up to the maximum possible steering angle RLw_max, which in this embodiment is 10°. In step 220, which also takes place at intervals of 10 ms, a steering angle demand Lw_req is detected by a suitable sensor system at the steering handling device. In this case it is determined whether and how the steering angle changes from the second range Lw2 to the first range Lw1. In other words, the change is determined in relation to angle, but also in relation to the rate of change. For a change of the steering angle $RLw_v$, $RLw_h$ in this range, the limit value a_lim is cancelled. From the next standstill the actuator can again operate at its nominal acceleration if it is determined in the control unit that no limitation of the acceleration is necessary. If in step 240 of determining the limit value a_lim the instantaneous steering angle is found to be in the range Lw2, then the limit value a_lim is changed to a limited acceleration. The reason for this is that owing to a previous setting of the steering angle in the range Lw2, a prestress has built up in the tires of the wheels 2, 3 on the axles 21, 31 concerned. In step 260 the actuator is activated by the control unit SG to set a steering angle $RLw_v$, $RLw_h$ and at least as a function of the steering angle demand Lw_req and using the limit value a_lim, a steering angle $RLw_v$, $RLw_h$ is set at the axle concerned.

Heavy loading of a vehicle can give rise to a situation in which the wheels are covered more deeply by the wheel arches and because of this the designed maximum steering angle RLw_max cannot be set, or else collisions could occur with the vehicle body or the chassis. For example, if such loading is detected by means of a height level sensor system of the chassis, then that driving situation is notified via the BUS bus system to the control unit SG. The maximum possible steering angle RLw_max is in such a case temporarily limited and stored in the control unit SG. In the above example, if this steering angle is within the first range Lw1, then no limitation of the actuator acceleration is necessary. The designed maximum steering angle can only be set again by the actuator when the driving situation changes.

The process steps according to the invention can be carried out repeatedly and in a sequence other than that indicated. Thus, the invention is not restricted to the sequence mentioned herein.

| Indexes | |
|---|---|
| 1 | (Motor) vehicle |
| 2 | Front wheel |
| 3 | Rear wheel |
| 4 | Steer-by-wire steering system |
| 5 | Steer-by-wire steering system |
| 14 | Steering-wheel |
| 21 | Front axle |
| 31 | Rear axle |
| 41 | Steering linkage |
| 51 | Steering linkage |
| 200 | Detection step |
| 220 | Detection step |
| 240 | Determination step |
| 260 | Activation step |
| ADAS | Driver assistance system, autonomous driving |
| BUS | Bus system |
| ESC | Electronic stability control |
| Korr | Corridor function |
| L | Longitudinal axis |
| Lw | Sensor unit |
| Lw_req | Steering angle demand |
| Lw1 | First steering angle range |
| Lw2 | Second steering angle range |
| PAS | Parking assistance system |
| $R_G$ | Yaw rate |
| $RL_{Wv}$ | Front (wheel) steering angle |
| $RL_{Wh}$ | Rear (wheel) steering angle |
| $RL_{Wv}$_mom | Front instantaneous (wheel) steering angle |
| $RL_{Wh}$_mom | Rear instantaneous (wheel) steering angle |
| $RL_W$_max | Maximum possible steering angle |
| SG | Control system, control unit |
| S | Sensor system |
| T | Trajectory |
| a_lim | Limit value |
| v_mom | Instantaneous speed |

The invention claimed is:

1. A method for operating an actuator of a steer-by-wire steering system of a motor vehicle at speeds from standstill to parking and/or maneuvering speeds, wherein the method comprises detecting an instantaneous steering angle of at least one wheel on an axle of the motor vehicle;

detecting a steering angle demand;

determining a limit value of an acceleration of a drive mechanism of an actuator, at least as a function of the instantaneous steering angle; and activating the actuator for setting a steering angle of at least one wheel, at least as a function of the steering angle demand and using the limit value of the acceleration.

2. The method according to claim 1, wherein determining the limit value includes at least temporarily changing the limit value.

3. The method according to claim 2, wherein determining the limit value includes setting the limit value to a predefined minimum value.

4. The method according to claim 1, comprising:

determining whether the instantaneous steering angle found in the determination step is smaller than a range of 50 to 80%, of a maximum possible steering angle; and determining a smaller limit value outside the range.

5. The method according to claim 4, wherein the range is from 65 to 70% of the maximum possible steering angle.

6. The method according to claim 1, comprising:
assigning a respective limit value to the instantaneous steering angle of each at least one wheel, wherein determining the limit value is based on the respective limit value; and
determining the limit value on the basis of at least one characteristic-stored in a control unit.

7. The method according to claim 1, wherein determining the limit value includes temporarily changing a steering gradient as a function of the steering angle demand and/or as a function of the instantaneous steering angle.

8. The method according to claim 7, comprising:
detecting an instantaneous speed of the motor vehicle, wherein when determining the limit value includes taking into account the instantaneous speed for speeds up to a predefined speed limit.

9. The method according to claim 8, comprising:
gradually restoring the limit value as a function of the instantaneous steering angle and/or as a function of the steering angle demand; and/or
gradually restoring the steering gradient after temporarily changing the steering gradient, as a function of the instantaneous steering angle and/or as a function of the steering angle demand.

10. A steer-by-wire steering system operable according to the method of claim 1, wherein the steer-by-wire steering system is in the form of a rear axle steering system.

11. A computer readable medium encoded with executable code that, when executed, performs the method of claim 1.

12. A control unit comprising a computer readable medium encoded with executable code that, when executed by the control unit, performs the method of claim 1.

13. A control unit for controlling an actuator of a steer-by-wire steering system of a motor vehicle, the control unit comprising:
an interface configured to detect a steering angle that represents an instantaneous steering angle of at least one wheel of a motor vehicle;
a further interface configured to detect a steering angle demand, which represents an instantaneous steering angle change due to a driver's wish or a change determined by the control unit or another control unit;
a unit configured to determine a limit value of an acceleration of the drive mechanism of the actuator of a steer-by-wire steering system, which represents an instantaneously limited acceleration and to determine a limit value of a drive mechanism of the actuator as a function of the instantaneous steering angle;
a unit configured to activate the actuator in order to set a steering angle of at least one wheel as a function of at least the steering angle demand, and using the limit value of the acceleration of the drive mechanism; and
an interface configured to detect a speed that represents an instantaneous speed of the motor vehicle.

14. The control unit of claim 13, wherein:
determining the limit value includes temporarily changing a steering gradient as a function of the steering angle demand and/or as a function of the instantaneous steering angle; and
gradually restore the steering gradient after temporarily changing the steering gradient, as a function of the instantaneous steering angle and/or as a function of the steering angle demand.

* * * * *